United States Patent Office 3,203,996
Patented Aug. 31, 1965

3,203,996
POLYHALOALKYLPOLYTHIO ALKANOLS
Joseph E. Moore, Richmond, Calif., assignor to California
Research Corporation, San Francisco, Calif., a corporation of Delaware
No Drawing. Filed Oct. 23, 1962, Ser. No. 232,583
4 Claims. (Cl. 260—608)

This invention relates to novel alkanols, their derivatives, and their use as fungicides. More particularly, this invention relates to alkanols substituted by a polyhaloalkylpolythio group, their derivatives and their use as fungicides.

It has now been found that the broad class of compounds which is included in the generic group of ω-[poly-halo(lower)alkylpolythio]alkanols and their hydroxy derivatives, i.e., esters and ethers, are useful as fungicides. The compounds of this invention have the formula:

$$ROXS_mR'$$

where R represents hydrogen and derivatives of an alcohol, X is an alkylene of 1 to 4 carbons, m is an integer and varies from 2 to 3, and R' is a polyhalo(lower)alkyl group wherein said halogens are of atomic number 17 through 35, i.e., bromine and chlorine.

The compounds of this invention are in the class of polysulfides, particularly, disulfide and trisulfide derivatives. Bonded to one of the available valences of the polysulfide group is an hydroxyalkyl group, while bonded to the other available valence is a polyhalo(lower)alkyl group.

The X is an alkylene group of from 1 to 4 carbons, e.g., methylene, ethylene, trimethylene, tetramethylene, isopropylene, 1,3-butylene, etc. The RO group is bonded to a primary carbon, that is, the carbon bonded to oxygen has two hydrogens. Preferred alkylene groups are of from 2 to 3 carbons.

The polyhalo(lower)alkyl group, designated as R' in the above formula, may be of from 1 to 6 carbons, having halogens of atomic number from 17 to 35. The preferred groups are of from 1 to 4 carbons. Particularly preferred are R' groups having only 2 carbons. The alkyl groups must have at least 3 halogens and preferably not more than 8 halogens. Particularly preferred are those groups having up to and including 5 halogens, one of which is alpha to the sulfur. That is, halogen is bonded to the carbon bonded to sulfur.

As already indicated, R may be a hydrogen or a radical which forms a bond with oxygen which may be cleaved on hydrolysis to regenerate the alcohol.

$$ROXS_mR' + H_2O \rightarrow ROH + HOXS_mR'$$

R includes within its scope both organic and inorganic esters and ethers. The ester and ether groups are not necessary for the activity of the alkanols of this invention, but provide a means for special application or more attractive physical properties, e.g., hydrophobic, hydrophilic, lipophilic, etc. R will generally be composed of carbon, hydrogen, oxygen, nitrogen and sulfur, but may include phosphorus, boron, etc.

With the exception of the borate ester, the esters have the atom which is bonded to the oxygen of the novel alcohols of this invention, also doubly bonded to a heteroatom, i.e., O and S, or coordinate-covalently bonded, which may be considered the equivalent of the double bond for this invention.

Among organic esters, i.e., carboxyacyl or non-oxo carbonyl derivatives, it is intended to include aliphatic, cycloaliphatic, aromatic and heterocyclic acyl and thiono radicals, as well as carbamates, carbonates, thiol carbonates, dithio carbonates, and thiocarbamates. The radicals are illustrated by the following formulas:

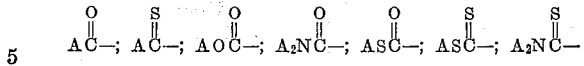

etc. A may be alkyl, aryl, cycloaliphatic, heterocyclic, alkaryl, aralkyl, etc., and also hydrogen when bonded to nitrogen or carbonyl.

Among inorganic esters included in the scope of this invention are sulfites, sulfates, sulfinates, sulfonates, phosphates, phosphorothioates, phosphorodithioates, phosphorotrithioates, borates, etc. These radicals are illustrated by the following formulas:

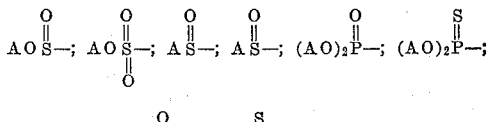

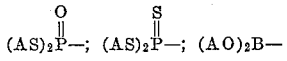

wherein A is as defined previously.

The R group of this invention is generally of not more than 18 carbons and preferably not more than 12 carbons. In most instances it will not be more than 8 carbons. The A group may be hydrocarbyl, such as lower alkyl or phenyl, or may be substituted by oxygen, as in ethers, sulfur, as in thioethers, halogen (i.e., fluorine, chlorine, bromine, iodine) nitro, cyano, etc. A is the group attached to the heteroatom bonded to the carbonyl carbon of the ester functionality, in which the heteroatom is chalcogen (oxygen or sulfur) or nitrogen. A will generally be not more than 17 carbons and preferably not more than 12 carbons. Particularly preferred is A of from 1 to 6 carbons.

The R and A groups are not the active portion of the molecule. While these groups may enhance activity or may aid in a particular application, the compounds of this invention do not derive their novel activity from these radicals. Great variation in these radicals is permitted without significant diminution of the activity of applicant's novel alcohols.

The following compounds may serve to illustrate the novel alcohols of this invention. Among β-ethanol derivatives are the following:

1,1,2-trichloroethyl 2-hydroxyethyl disulfide or
β-(1,1,2-trichloroethyldithio)ethanol
β-(1,2-dibromo-1,2-dichloroethyldithio)ethanol
β-(2,2,2-tribromoethyldithio)ethanol
β-(2,3-dibromo-1,2-dichloropropyldithio)ethanol
β-(2,2,3,3-tetrachloropropyldithio)ethanol
β-[2-(1,1,1,3,3,3-hexachloropropyl)dithio]ethanol
β-(1,2,2,3,3-pentachlorobutyldithio)ethanol
β-[3-(1,1,2,2-tetrachlorobutyl)dithio]ethanol
β-(1,1,5,5,5-pentachloro-4-trichloromethylpentyldithio)
 ethanol
β-(1,1,2-trichloroethyltrithio)ethanol
β-(1,2,2,3-tetrachloropropyltrithio)ethanol Among propanol compounds are the following:

γ-(1,2-dibromo-1,2-dichlorodithio)propanol
γ-(perchloroethyldithio)propanol
γ-[2-(1,2,3,4-tetrachlorobutyl)dithio]propanol
γ-(1,1,2-trichloroethyltrithio)propanol
γ-(1,1,2,2-tetrachloropropyltrithio)propanol Among butanol compounds are the following:

δ-(1,1,2,2-tetrachloroethyldithio)butanol
γ-(trichloromethyldithio)butanol
γ-(1,2,4-trichloropropyltrithio)butanol
δ-(4-H-perchlorobutyldithio)butanol
β-(tribromomethyldithio)butanol
δ-(2,2,2-trichloromethyldithio)butanol Various carboxylic acids may be used to esterify the hydroxyl oxygen of the alcohols of this invention. Illustrative of carboxylic acid radicals are the following: propionyl butyroyl, decanoyl, pivaloyl, octadecanoyl, benzoyl, naphthoyl, p-bromobenzoyl, furoyl, thienoyl, α-, β-, γ-picolinoyl, cyclohexylformyl, m-nitrobenzoyl, p-isopropylbenzoyl, p-carbamylbenzoyl, etc.; illustrative of carbonic acid radicals are the following: methoxycarbonyl, hexyloxycarbonyl, phenoxycarbonyl, benzyloxycarbonyl, p-nitrobenzyloxycarbonyl, 2,4 - dichlorophenoxycarbonyl, etc.; illustrative of carbamic acid radicals are the following: N,N-dimethylcarbamoyl, N-methyl N-hexylcarbamoyl, N,N-tetramethylenecarbamoyl, N,N-di-p-nitrophenylcarbamoyl, N-naphthylcarbamoyl, etc.; illustrative of thiocarbonic acid radicals are the following: n-thiooctyloxycarbonyl, thiophenoxycarbonyl, thiobenzyloxycarbonyl, thio-p-bromobenzyloxycarbonyl, etc.

Illustrative of organic acid derivatives of the novel alcohols of this invention are the following compounds:

β-(trichloromethyldithio)ethyl benzoate
β-(perchloroethyldithio)ethyl phenylacetate
β-(1,1,2-trichloroethyldithio)ethyl p-methoxybenzoate
β-(1,1,2,3-tetrachloropropyldithio)ethyl N-ethyl-carbamate
β-[2-(1,1,2,3-tetrachlorobutyl)dithio]ethyl butyrate
di-γ-(1,1,2,2,3,3-hexachloropropyldithio)propyl carbonate
γ-(1,1,2,2-tetrachloroethyldithio)propyl S-ethyl thiolcarbonate
γ-(perchloroethyltrithio)propyl furoate, etc.

Among inorganic acid derivatives are the following compounds: As illustrative of sulfate esters included in this invention are such compounds as di-[β-(1,2,2-trichloroethyldithio)ethyl]sulfate
di-[β-(1,2,3,4-tetrachlorobutyldithio)ethyl]sulfate
ethyl β-(1,1,2-trichloroethyldithio)ethyl sulfate
phenyl γ-[2-(1-chloro-2,3-dibromopropyl)dithio]propyl sulfate, etc.

Illustrative of sulfite esters are:

di-[β-(trichloromethyldithio)ethyl]sulfite
di-[γ-(1,1,2,2-tetrachloroethyldithio)propyl]sulfite, etc.

Examples of phosphate esters are

O,O-dimethyl O-[β-(perchloroethyldithio)ethyl]phosphate
O,O-dipropyl O-[β-(1,2,3-trichloropropyldithio)ethyl] phosphate
S,S-di-phenyl O-[β-(1,1,2,2,3,3-hexachlorobutyldithio) ethyl]phosphorodithioates
O,O-dimethyl O-[β-(perchloroethyldithio)propyl]phosphorothionoate, etc.

Various aromatic and aliphatic ethers may be prepared with the lower alkyl ethers being preferred. That is, alkyl groups of from 1 to 6 carbons. The aliphatic and aromatic ethers may be substituted or unsubstituted as with hydroxy, alkoxy, nitro, halo, carboalkoxy, etc. Illustrative of groups which can be bonded to the oxygen are butyl, hexyl, benzyl, p-nitrobenzyl, 2,4-dinitrophenyl, 2-chloroethyl, etc.

The novel alcohols of this invention may be prepared by the reaction between the desired mercapto alcohol and the desired polyhaloalkyl-sulfenyl or -thiosulfenyl halide. Temperatures in the range of 0 to 50° C. may be used, but ambient temperatures or somewhat lower are preferred, that is, temperatures in the range of 0 to 25° C.

Various solvents may be used in the reaction which are inert to the reactants and products. Preferred solvents are halogenated hydrocarbons.

The following examples are offered as illustrative of the methods of preparation of the novel compounds of this invention:

EXAMPLE I

Into a solution of 50.0 grams of 1,1,2,2-tetrachloroethylsulfenyl chloride in 100 ml. of carbon tetrachloride maintained at a temperature of about 10 to 15° C. was added dropwise over a 30 minutes period 16.7 grams of 2-mercaptoethanol. After stirring for an additional 30 minutes at room temperature, the solvent was removed by distillation. The temperature in the distilling pot was not permitted to exceed 100° C. at 0.7 mm. pressure. A yield of 53.5 grams of 2-hydroxyethyl 1,1,2,2-tetrachloroethyl disulfide was obtained.

| Analysis | Theory, percent | Found, percent |
|---|---|---|
| Cl | 51.4 | 48.8 |
| S | 23.2 | 23.4 |

EXAMPLE II

To a solution of 1.23 grams of 3-mercaptopropanol in 100 ml. of carbon tetrachloride at about 10 to 15° C. was added dropwise over a 30 minute period 4 grams of pentachloroethylthiosulfenyl chloride. After stirring for an additional 30 minutes at room temperature, the solvent was removed by distillation. The bath temperature was maintained below 100° C. and the pressure at 0.7 mm. A yield of 4.1 grams of 3-hydroxypropylpentachloroethyltrisulfide was obtained.

| Analysis | Theory, percent | Found, percent |
|---|---|---|
| Cl | 49.7 | 49.8 |
| S | 26.9 | 26.6 |

The following table, Table I, lists compounds prepared in the manner indicated in Examples I and II.

Table 1

| Ex. | Structure | Cl Calc. | Cl Fd. | S Calc. | S Fd. |
|---|---|---|---|---|---|
| III | CCl$_3$—CH$_2$—S—S—CH$_2$—CH$_2$OH | 44.1 | 43.8 | 26.6 | 26.5 |
| IV | CHCl$_2$—CHCl—S—S—CH$_2$—CH$_2$OH | 44.1 | 42.6 | 26.6 | 26.6 |
| V | CCl$_3$—CHCl—S—S—CH$_2$—CH$_2$OH | 51.3 | 49.5 | 23.2 | 23.9 |
| VI | CCl$_3$—CCl$_2$—S—S—CH$_2$—CH$_2$OH | 57.0 | 51.9 | 20.7 | 22.0 |
| VII | CH$_2$Cl—CCl(CH$_2$Cl)—S—S—CH$_2$—CH$_2$OH | 41.7 | 43.2 | 25.1 | 23.9 |
| VIII | CH$_2$Cl—CCl$_2$—CH$_2$—S—S—CH$_2$—CH$_2$OH | 41.7 | 42.1 | 25.1 | 24.6 |
| IX | CH$_2$Cl—CCl$_2$—CHCl—S—S—CH$_2$—CH$_2$OH | 48.8 | 48.7 | 22.1 | 21.0 |
| X | CH$_2$Cl—CH(CCl$_2$—CH$_3$)—S—S—CH$_2$—CH$_2$OH | 39.5 | 38.5 | 23.8 | 24.5 |
| XI | CH$_2$Cl—CCl(CHCl—CH$_2$Cl)—S—S—CH$_2$—CH$_2$OH | 46.6 | 45.4 | 21.1 | 21.4 |
| XII | CCl$_3$—S—S—S—CH$_2$—CH$_2$OH | 41.0 | 37.5 | 37.1 | 37.1 |
| XIII | CHCl$_2$—CCl$_2$—S—S—CH$_2$—CH$_2$OH | 46.0 | 44.7 | 31.2 | 30.7 |
| XIV | CCl$_3$—CCl$_2$—S—S—S—CH$_2$—CH$_2$OH | 52.0 | 49.0 | 28.1 | 28.4 |
| XV | CHCl$_2$—CCl$_2$—S—S—CH$_2$—CH$_2$—CH$_2$OH | 48.8 | 45.7 | 22.1 | 23.2 |
| XVI | CHCl$_2$—CCl$_2$—S—S—CH—CH$_2$OH<br>\|<br>CH$_3$ | 48.8 | 46.2 | 22.1 | 23.5 |

Derivatives of applicant's compounds were prepared according to methods well known in the art. For the preparation of esters, such compounds as acids, acid anhydrides, and acid halides may be used according to procedures known in the art. When desirable, transesterification may also be used. Etherification may be achieved with sulfate esters, active halogen compounds and the alkoxide of the alcohol by methods known in the art. With some of the derivatives it may be preferable to prepare the oxygen derivative first and then contact the resulting mercaptan with the desired polyhaloalkylthio or thiosulfenyl halide.

The following examples indicate the preparation of individual derivatives.

EXAMPLE XVII

A solution of 5.6 grams of 4-chlorophenylisocyanate, 10.0 grams of 2-hydroxyethyl 1,2,2,2-tetrachloroethyl disulfide, and one drop of dibutyl tin dilaurate in 50 mls. of dry benzene were allowed to stand for one week at room temperature. The solvent was removed by distillation, the product being heated to a maximum temperature of 100° C. at 0.4 mm. Twelve grams of 4-chlorophenylcarbamoyloxyethyl 1,2,2,2-tetrachloroethyl disulfide was obtained as an oil which slowly crystallized on standing.

| Analysis | Theory, Percent | Found, Percent |
|---|---|---|
| N | 3.3 | 4.1 |

EXAMPLE XVIII

Into a flask fitted with condenser, thermometer, stirrer, and dropping funnel was introduced 8.5 grams of 1,1,2,2-tetrachloroethylsulfenyl chloride in 100 ml. carbon tetrachloride. Into the mixture cooled in an ice bath was added 3.3 grams of a 61% solution of 2-methoxyethyl mercaptan diluted with carbon tetrachloride. The mercaptan was added dropwise and very sloyly. After addition was completed, the reaction mixture was refluxed for about 10 minutes. The mixture was then allowed to cool to room temperature and the solvent stripped under a water vacuum. The residue was distilled yielding 4 grams boiling in a range of 100° to 117° C. at 0.4 to 0.6 mm. mercury.

| Analyzed | Theory, Percent | Found, Percent |
|---|---|---|
| Cl | 48.8 | 46.4 |
| S | 22.1 | 23.7 |

The following table, Table II, lists derivatives of the novel alcohols of this invention prepared according to procedures well known in the art.

*Table II*

| Structure | M.P. | Cl Calc. | Cl Fd. | S Calc. | S Fd. | N or P Calc. | N or P Fd. |
|---|---|---|---|---|---|---|---|
| $CCl_3-S-S-CH_2CH_2O-CO-CH_3$ | --- | 39.4 | 34.3 | --- | --- | --- | --- |
| $CCl_3-S-S-S-CH_2-CH_2-O-\overset{O}{\underset{\|}{C}}-NHCH_3$ | --- | --- | --- | --- | --- | (N) 4.4 | (N) 3.8 |
| $CHCl_2-CHCl-S-S-CH_2-CH_2-O-\overset{O}{\underset{\|}{C}}-NH-\text{C}_6\text{H}_4-Cl$ | --- | 35.8 | 36.2 | --- | --- | (N) 3.5 | (N) 3.5 |
| $CHCl_2-CHCl-S-S-CH_2-CH_2-O-\overset{O}{\underset{\uparrow}{P}}(OC_2H_5)_2$ | --- | 28.1 | 28.9 | 17.0 | 19.0 | --- | --- |
| $CCl_3-CHCl-S-S-CH_2-CH_2-O-\overset{O}{\underset{\|}{C}}-O-CH_2-CH_2-S-\text{C}_6\text{H}_4-Cl$ | --- | 36.2 | 36.8 | 19.7 | 19.9 | --- | --- |
| $CCl_3-CHCl-S-S-CH_2-CH_2-O-\overset{O}{\underset{\|}{C}}-S-C_2H_5$ | --- | 38.8 | 41.0 | 26.4 | 25.5 | --- | --- |
| $CCl_3-CHCl-S-S-CH_2-CH_2-O-\overset{O}{\underset{\|}{C}}-NH-\text{C}_6\text{H}_4-Cl$ | 58–63°C. | --- | --- | --- | --- | (N) 3.4 | (N) 4.1 |
| $CCl_3-CHCl-S-S-CH_2CH_2-O-\overset{O}{\underset{\|}{C}}-NHCH_3$ | --- | 42.5 | 40.3 | 19.3 | 18.6 | --- | --- |
| $CCl_3-CHCl-S-S-CH_2-CH_2O-\overset{O}{\underset{\uparrow}{P}}(OC_2H_5)_2$ | --- | 34.4 | 35.9 | 15.5 | 17.1 | (P) 7.5 | (P) 6.3 |
| $CCl_3-CHCl-S-S-CH_2-CH_2-O-\overset{O}{\underset{\|}{C}}-NH-\text{C}_6\text{H}_5$ | 58–60°C. | 35.9 | 35.6 | 16.2 | 16.9 | --- | --- |
| $CCl_3-CHCl-S-S-CH_2-CH_2-O-\overset{O}{\underset{\|}{C}}-CH_2Cl$ | --- | 50.3 | 49.0 | 18.2 | 20.2 | --- | --- |
| $CHCl_2-CCl_2-S-S-CH_2-CH_2-O-\overset{O}{\underset{\|}{C}}-CH_3$ | --- | 44.6 | 43.3 | 20.1 | 20.5 | --- | --- |
| $CHCl_2-CCl_2-S-S-CH_2-CH_2-O-\overset{O}{\underset{\|}{C}}-O-CH_2-CH_2-S-\text{C}_6\text{H}_4-Cl$ | --- | 36.2 | 35.0 | 19.7 | 20.0 | --- | --- |

TABLE II—Continued

| Structure | M.P. | Cl Calc. | Cl Fd. | S Calc. | S Fd. | N or P Calc. | N or P Fd. |
|---|---|---|---|---|---|---|---|
| $CHCl_2-CCl_2-S-S-CH_2-CH_2-O-\overset{O}{\underset{\|}{C}}-S-\langle\text{ring}\rangle-Cl$ | -------- | 39.6 | 34.9 | 21.5 | 23.3 | -------- | ----- |
| $CHCl_2-CCl_2-S-S-CH_2-CH_2-O-\overset{O}{\underset{\|}{C}}-S-C_2H_5$ | -------- | 38.8 | 43.2 | 22.4 | 26.4 | -------- | ----- |
| $CHCl_2-CCl_2-S-S-CH_2-CH_2-O-\overset{O}{\underset{\|}{C}}-NH-\langle\text{ring}\rangle-Cl$ | -------- | 41.3 | 39.2 | 14.9 | 15.6 | (N) 3.3 | (N) 3.1 |
| $CHCl_2-CCl_2-S-S-CH_2-CH_2-O-\overset{O}{\underset{\|}{C}}-NH-\langle\text{ring-Cl}\rangle$ | -------- | 41.3 | 39.1 | 14.9 | 15.1 | -------- | ----- |
| $CHCl_2-CCl_2-S-S-CH_2-CH_2-O-\overset{O}{\underset{\|}{C}}-NHCH_3$ | -------- | 42.5 | 40.1 | 19.3 | 19.9 | -------- | ----- |
| $[CHCl_2-CCl_2-S-S-CH_2-CH_2-O]_2S\overset{O}{\underset{O}{\lessgtr}}$ | -------- | 46.2 | 50.0 | 26.1 | 25.0 | -------- | ----- |
| $[CHCl_2-CCl_2-S-S-CH_2-CH_2-O]_2S \rightarrow O$ | -------- | 47.5 | 45.3 | 26.8 | 26.7 | -------- | ----- |
| $CHCl_2-CCl_2-S-S-CH_2-CH_2-O-\overset{O}{\underset{\uparrow}{P}}(OC_2H_5)_2$ | -------- | -------- | -------- | -------- | -------- | (P) 7.5 | (P) 5.7 |
| $CHCl_2-CCl_2-S-S-CH_2-CH_2-O-\overset{O}{\underset{O}{\overset{\|}{S}}}-OC_2H_5$ | -------- | 36.8 | 40.7 | 25.0 | 25.4 | -------- | ----- |
| $CHCl_2-CCl_2-S-S-CH_2-CH_2-O-CH_3$ | -------- | -------- | -------- | -------- | -------- | -------- | ----- |

The novel compounds of this invention were tested for fungicidal activity by means of the mycelial drop test. This test is designed to measure the fungitoxic activity of fungicidal chemicals in terms of their degree of inhibition upon mycelial growth.

Each fungitoxic compound to be tested was dissolved in acetone in dilutions as indicated in the following table. Paper discs previously inoculated by impregnation with equal amounts of a particular fungus mycelium and placed on potato dextrose agar medium were treated by applying a precise and equal volume of each of these fungicidal solutions to their center. Following treatment with the fungitoxic chemical, the discs were incubated along with inoculated but untreated control discs at ambient temperatures until such time as these untreated control discs were filled with mycelial growth. Activity of the fungitoxic chemical tested was determined by comparative measurements of radii of mycelial growth away from the edge of the disc in treated and untreated samples. From this comparison a percentage inhibition of growth area can be determined.

The novel compounds of this invention were also compared for fungicidal activity by means of "The Standard Spore Slide-Germination Method for Determining Fungicidal Activity." The results obtained are expressed in terms of percent inhibition of germination of fungus spores.

Each compound to be tested was dissolved in acetone in dilutions of 1.0 p.p.m. These solutions were then pipetted into the wells of depression slides and allowed to dry. The wells were filled with a spore suspension of the test organism, *Monilinia fructicola*, and incubated in a moist chamber overnight. A group of one-hundred spores was examined and the number of spores germinated and not germinated was counted and recorded to show the biological activity in terms of the percentage germination inhibition.

The results of these tests for various chemicals of this invention on the particular fungus mycelium and spores are indicated as shown in Table III for the novel alcohols and Table IV for the novel esters and ethers. A comparison of Tables III and IV illustrates the absence of any significant adverse effect on activity when using an ester or ether derivative rather than the parent alcohol. Only small differences are obtained despite wide variations in the type of derivative.

Table III

| Structure | Pythium (mycelium) P.p.m. | Pythium (mycelium) Percent | Rhizoctonia (mycelium) P.p.m. | Rhizoctonia (mycelium) Percent | Monilinia (spores) P.p.m. | Monilinia (spores) Percent |
|---|---|---|---|---|---|---|
| $HOCH_2CH_2-S-S-CH_2-\underset{\underset{Cl}{\|}}{\overset{\overset{Cl}{\|}}{C}}-Cl$ | 1,000 | 100 | 1,000 | 100 | 10 | 100 |
| $HOCH_2CH_2-S-S-\underset{\underset{H}{\|}}{\overset{\overset{Cl}{\|}}{C}}-\underset{\underset{Cl}{\|}}{\overset{\overset{Cl}{\|}}{C}}-H$ | 1,000 / 500 / 250 | 100 / 100 / 100 | 1,000 / 500 / 250 | 100 / 100 / 100 | 10 / 3 / 1 | 100 / 100 / 100 |

TABLE III—Continued

| Structure | Pythium (mycelium) | | Rhizoctonia (mycelium) | | Monilinia (spores) | |
|---|---|---|---|---|---|---|
| | P.p.m. | Percent | P.p.m. | Percent | P.p.m. | Percent |
| $HOCH_2CH_2-S-S-\underset{\underset{Cl}{|}}{\overset{\overset{Cl}{|}}{C}}-\underset{\underset{Cl}{|}}{\overset{\overset{Cl}{|}}{C}}-H$ | 1,000<br>500<br>250 | 100<br>100<br>100 | 1,000<br>500<br>250 | 100<br>100<br>67 | 10<br>3<br>1 | 100<br>100<br>100 |
| $HOCH_2CH_2-S-S-\underset{\underset{H}{|}}{\overset{\overset{Cl}{|}}{C}}-\underset{\underset{Cl}{|}}{\overset{\overset{Cl}{|}}{C}}-Cl$ | 1,000<br>500<br>250 | 100<br>100<br>100 | 1,000<br>500<br>250 | 100<br>76<br>33 | 10<br>3<br>1 | 100<br>100<br>100 |
| $HOCH_2CH_2-S-S-\underset{\underset{Cl}{|}}{\overset{\overset{Cl}{|}}{C}}-\underset{\underset{Cl}{|}}{\overset{\overset{Cl}{|}}{C}}-Cl$ | 1,000 | 100 | 1,000 | 100 | 10 | 100 |
| $HOCH_2CH_2-S-S-\underset{\underset{CH_2-Cl}{|}}{\overset{\overset{CH_2-Cl}{|}}{C}}-Cl$ | 1,000<br>500<br>250 | 100<br>100<br>100 | 1,000<br>500<br>250 | 100<br>100<br>56 | 10<br>3<br>1 | 100<br>85<br>77 |
| $HOCH_2CH_2-S-S-\underset{\underset{H}{|}}{\overset{\overset{H}{|}}{C}}-\underset{\underset{Cl}{|}}{\overset{\overset{Cl}{|}}{C}}-\underset{\underset{H}{|}}{\overset{\overset{H}{|}}{C}}-Cl$ | 1,000 | 100 | 1,000 | 28 | 10 | 100 |
| $HOCH_2CH_2-S-S-\underset{\underset{H}{|}}{\overset{\overset{Cl}{|}}{C}}-\underset{\underset{Cl}{|}}{\overset{\overset{Cl}{|}}{C}}-\underset{\underset{H}{|}}{\overset{\overset{H}{|}}{C}}-Cl$ | 500<br>250 | 100<br>99 | 250 | 50 | 10<br>3<br>1 | 100<br>100<br>100 |
| $HOCH_2CH_2-S-S-\underset{\underset{CCl_2-CH_3}{|}}{\overset{\overset{CH_2Cl}{|}}{C}H}$ | 1,000<br>500<br>250 | 100<br>96<br>30 | 1,000<br>500 | 100<br>50 | | |
| $HOCH_2CH_2-S-S-\underset{\underset{CHCl-CH_2Cl}{|}}{\overset{\overset{CH_2Cl}{|}}{C}}-Cl$ | 1,000<br>500<br>250 | 100<br>98<br>96 | 1,000<br>500<br>250 | 100<br>96<br>96 | 10<br>3 | 100<br>60<br>K |
| $HOCH_2CH_2-S-S-S-\underset{\underset{Cl}{|}}{\overset{\overset{Cl}{|}}{C}}-Cl$ | -------- | -------- | -------- | -------- | 10 | 100 |
| $HOCH_2CH_2-S-S-S-\underset{\underset{Cl}{|}}{\overset{\overset{Cl}{|}}{C}}-\underset{\underset{Cl}{|}}{\overset{\overset{Cl}{|}}{C}}-H$ | 1,000 | 100 | 1,000 | 100 | 10 | 100 |
| $HOCH_2CH_2-S-S-S-\underset{\underset{Cl}{|}}{\overset{\overset{Cl}{|}}{C}}-\underset{\underset{Cl}{|}}{\overset{\overset{Cl}{|}}{C}}-Cl$ | 500<br>250 | 100<br>100 | 1,000<br>500<br>250 | 100<br>100<br>94 | 10 | 100 |
| $HOCH_2CH_2CH_2-S-S-\underset{\underset{Cl}{|}}{\overset{\overset{Cl}{|}}{C}}-\underset{\underset{Cl}{|}}{\overset{\overset{Cl}{|}}{C}}-H$ | 1,000<br>500<br>250 | 100<br>100<br>100 | 1,000<br>500<br>250 | 100<br>100<br>100 | 10<br>3<br>1 | 100<br>100<br>100 |
| $HOCH_2CH_2CH_2-S-S-S-\underset{\underset{Cl}{|}}{\overset{\overset{Cl}{|}}{C}}-\underset{\underset{Cl}{|}}{\overset{\overset{Cl}{|}}{C}}-Cl$ | 1,000<br>500<br>250 | 100<br>100<br>100 | 1,000<br>500<br>250 | 100<br>100<br>100 | 10<br>3<br>1 | 100<br>100<br>100 |
| $HOCH_2\underset{\underset{CH_3}{|}}{CH}-S-S-\underset{\underset{Cl}{|}}{\overset{\overset{Cl}{|}}{C}}-\underset{\underset{Cl}{|}}{\overset{\overset{Cl}{|}}{C}}-H$ | 1,000 | 100 | 1,000 | 100 | 10<br>3<br>1 | 100<br>100<br>100 |

Table IV

| Structure | Pythium | | Rhizoctonia | | Monilinia | |
|---|---|---|---|---|---|---|
| | P.p.m. | Percent | P.p.m. | Percent | P.p.m. | Percent |
| $H-\underset{\underset{Cl}{|}}{\overset{\overset{Cl}{|}}{C}}-\underset{\underset{Cl}{|}}{\overset{\overset{Cl}{|}}{C}}-S-S-CH_2CH_2O-\overset{\overset{O}{\|}}{C}-CH_3$ | 500<br>250<br>125 | 100<br>100<br>100 | 500<br>250<br>150 | 100<br>100<br>72 | 10<br>3<br>1 | 100<br>100<br>100 |

TABLE IV—Continued

| Structure | Pythium | | Rhizoctonia | | Monilinia | |
|---|---|---|---|---|---|---|
| | P.p.m. | Percent | P.p.m. | Percent | P.p.m. | Percent |
| HCCl₂—CCl₂—S—S—CH₂CH₂O—C(=O)—O—CH₂—CH₂—S—C₆H₄—Cl | 500<br>250 | 100<br>80 | 500 | 20 | 10<br>3 | 100<br>62 |
| HCCl₂—CCl₂—S—S—CH₂CH₂O—C(=O)—S—C₆H₄—Cl | 1,000 | 29 | 1,000 | 9 | 10<br>3 | 100<br>56 |
| HCCl₂—CCl₂—S—S—CH₂CH₂O—C(=O)—S—CH₂—CH₃ | 1,000<br>500<br>250 | 100<br>100<br>100 | 1,000<br>500<br>250 | 100<br>88<br>40 | 10<br>3 | 100<br>100 |
| HCCl₂—CCl₂—S—S—CH₂CH₂O—C(=O)—NH—C₆H₄—Cl | 500<br>250 | 100<br>100 | 500<br>250<br>125 | 100<br>33<br>11 | 10<br>3<br>1 | 100<br>100<br>48 |
| HCCl₂—CCl₂—S—S—CH₂CH₂O—C(=O)—NH—C₆H₄(Cl) | -------- | -------- | -------- | -------- | 10<br>3 | 100<br>94 |
| HCCl₂—CCl₂—S—S—CH₂CH₂O—C(=O)—NH—CH₃ | 500<br>250<br>125 | 100<br>100<br>100 | 500<br>250<br>125 | 100<br>100<br>86 | 10<br>3<br>1 | 100<br>100<br>100 |
| (HCCl₂—CCl₂—S—S—CH₂CH₂O)₂—S(=O)₂ | 500<br>250<br>125 | 100<br>100<br>100 | 500<br>250<br>125 | 94<br>38<br>22 | 10<br>3 | 100<br>100 |
| (HCCl₂—CCl₂—S—S—CH₂CH₂O)₂—S=O | 1,000 | 100 | 1,000 | 97 | 10<br>3<br>1 | 100<br>67<br>30 |
| HCCl₂—CCl₂—S—S—CH₂CH₂O—P(=O)(OC₂H₅)(OC₂H₅) | 500<br>250 | 100<br>79 | 500<br>250 | 80<br>55 | 10<br>3 | 100<br>100 |
| HCCl₂—CCl₂—S—S—CH₂CH₂O—S(=O)—O—C₂H₅ | 1,000 | 100 | 1,000 | 100 | 10 | 100 |
| HCCl₂—CCl₂—S—S—CH₂CH₂O—CH₃ | 1,000<br>500 | 100<br>100 | 1,000<br>500<br>250 | 100<br>78<br>15 | 10 | 100 |

Aside from the specific formulation and application of the class of compounds of the invention as represented by the foregoing test, these compounds may be dispersed in or upon other inert liquid and solid carriers such as inert clay, xylenes, etc. The solid carriers may be in the form of a dust, or used in conjunction with a suitable wetting agent to form a wettable powder. The fungitoxic compounds of this invention may also be formulated with other solvents, dispersing agents, or emulsifying agents. Further, these compounds may not only be applied alone or in mixes with other compounds of the disclosed class, but may also be used in combination with other active toxicants in the formulation of fungicidal compositions.

The compounds may be applied to any environmental area which is a host to fungus or susceptible to fungus attack. For example, the fungicidal compositions may be sprayed or otherwise applied directly to a plant or other host, may be applied to the plant seed, sprayed upon the soil or other plant environment, or used in similar ways so as to effect the control of fungus and fungus caused diseases.

Obviously, many modifications and variations of the invention, as hereinabove set forth, may be made without departing from the spirit and scope thereof, and, therefore, only such limitations should be imposed as are indicated in the appended claims.

I claim:
1. Compound of the formula

$$HOXS_mR'$$

wherein X is an alkylene of from 1 to 4 carbons, $m$ is an integer from 2 to 3, and R' is polyhalo(lower)alkyl, having at least 3 halogens, wherein said halogens are of atomic number 17 through 35.
2. β-(1,1,2,2-tetrachloroethyldithio)ethanol.
3. β-(1,1,2,2-tetrachloroethyltrithio)ethanol.
4. γ-(Perchloroethyltrithio)propanol.

No References Cited.

CHARLES B. PARKER, *Primary Examiner.*
DANIEL D. HORWITZ, *Examiner.*

UNITED STATES PATENT OFFICE
CERTIFICATE OF CORRECTION

Patent No. 3,203,996                                                     August 31, 1965

Joseph E. Moore

It is hereby certified that error appears in the above numbered patent requiring correction and that the said Letters Patent should read as corrected below.

Column 2, lines 14 to 16, for the fourth formula reading

      read      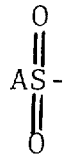

columns 9 and 10, TABLE III-Continued, in the eight structure, last column, strike out "K"; columns 11 and 12, TABLE IV-Continued, the third structure should appear as shown below instead of as in the patent:

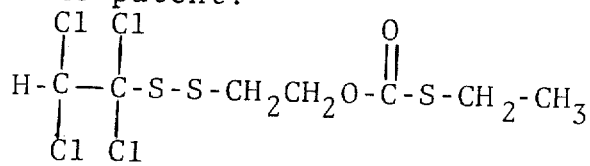

Signed and sealed this 10th day of May 1966.

(SEAL)
Attest:

ERNEST W. SWIDER
Attesting Officer

EDWARD J. BRENNER
                                       Commissioner of Patents